(No Model.)
D. STONE.
HORSE COLLAR.
No. 421,987. Patented Feb. 25, 1890.
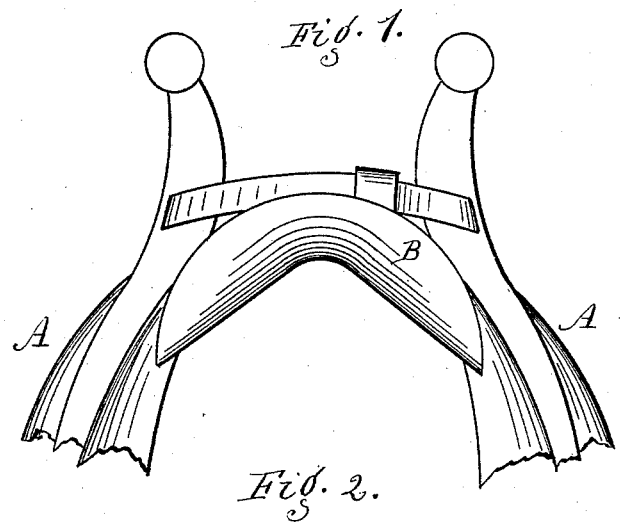
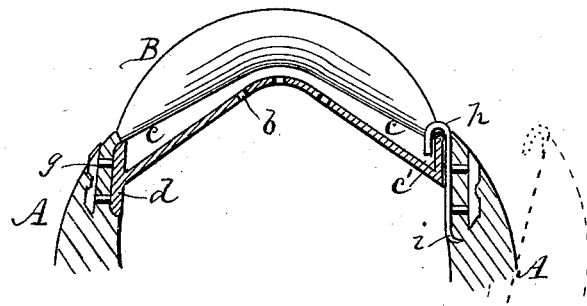
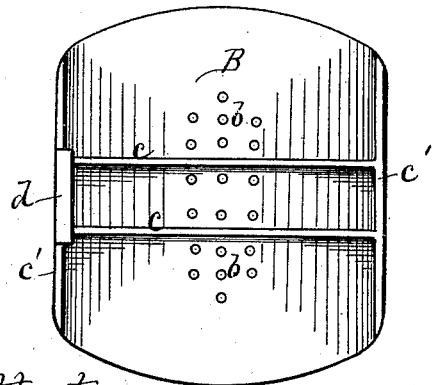
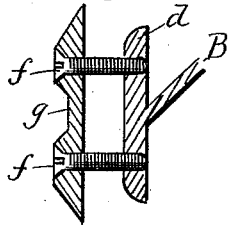
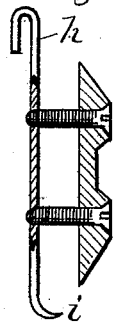
Attest.
Chas. J. Spencer
H. E. Shaffer
Inventor.
Draper Stone.
per R. L. Osgood,
atty.

UNITED STATES PATENT OFFICE.

DRAPER STONE, OF PITTSFORD, NEW YORK.

HORSE-COLLAR.

SPECIFICATION forming part of Letters Patent No. 421,987, dated February 25, 1890.

Application filed August 24, 1881. Serial No. 40,553. (No model.)

*To all whom it may concern:*

Be it known that I, DRAPER STONE, of Pittsford, Monroe county, New York, have invented a certain new and useful Improvement in Horse-Collars; and I do hereby declare that the following is a full, clear, and exact description of the same, reference being had to the accompanying drawings, in which—

Figure 1 is a front elevation of the top of a collar with my improvement applied thereto. Fig. 2 is a cross-section. Fig. 3 is a plan of the pad. Figs. 4 and 5 are detail views.

My improvement relates to horse-collars in which a thin metallic pad or plate is used at the top, forming the bearing that rests upon the horse's neck. Such pads are known; hence I do not claim them, broadly.

My invention consists in the construction and arrangement of parts hereinafter more fully described and definitely claimed.

In the drawings, A A represent the two sides of the collar, which is closed at the bottom and open at the top.

B is a thin metallic pad or plate which forms the top bearing of the collar on the horse's neck, being made of the proper curved form to fit, and requiring no padding or covering such as is ordinarily employed in common collars. A series of perforations *b b* is made through the top of the plate to allow ventilation and escape of perspiration. The plate has two or more flanges or ribs *c c*, extending crosswise, which join at the ends with corresponding right-angled flanges *c' c'*, the whole forming stiffeners and also serving as the catch to hold the locking-hook hereinafter described.

On one side the plate has a lug *d*, by which the plate is attached to one side of the collar in a permanent manner by two or more screws *f f*, which pass through a metallic block or bearing *g* on the outside of the collar, passing also through the collar and into the lug *d*, by which means this side of the plate is made a permanent and fixed attachment to the collar.

On the inner side of the opposite end of the collar is a hook *h*, secured by screws passing through a block and the collar in the same manner as the pad is attached on the opposite side. The hook has a shank with a curved point *i*, which, when the pressure is applied by the screws, strikes into the leather and holds the hook from turning. The hook is of such form as to engage with and disengage from the flange *c'* on one side of the plate. When hooked on, as shown in Fig. 2, the two parts of the collar are locked together, and the hames can then be easily applied. When unhooked, the top of the collar is free and the collar can then be spread or opened to any desired extent.

The collar might be made effective without the use of the hook, as the hames will bind the sides of the collar in place; but the hook is of great advantage to hold the sides of the collar in position while the hames are being applied. Other fastening devices may be used instead of the hook.

By making the pad in one piece and permanently attached on only one side, as in this invention, the pad can be made of proper form to fit accurately upon the horse's shoulder, and at the same time the top of the collar is left open, so that it can be spread to any desired extent. It is also adapted to be fastened higher or lower on top the collar, thereby making the collar longer or shorter, as may be necessary. By the use of the hook or equivalent fastening, the two parts of the collar can be temporarily fastened or unfastened, and when fastened it holds the collar in position while the hames are being applied.

I disclaim a horse-collar having a metallic pad permanently attached to the collar on one side and secured by a strap and buckle on the other side; but

I claim—

1. In a horse-collar divided at its top, the combination, with the metallic pad or plate B, attached permanently on one side of the collar, but disconnected on the other side, and provided with the flange *c'*, of a hook *h*, attached to the disconnected side of the collar and hooking over the flange *c'*, as shown and described, and for the purpose specified.

2. In a horse-collar divided at its top, the metallic pad or plate B, made of curved form and constituting the top bearing of the collar and constructed with the cross-flanges $c\ c$ and longitudinal flanges $c'\ c'$, as shown and described, and for the purpose specified.

In witness whereof,I have hereunto signed my name in the presence of two subscribing witnesses.

DRAPER STONE.

Witnesses:
R. F. OSGOOD,
CHAS. F. SPENCER.